United States Patent
Brunet et al.

(10) Patent No.: US 9,081,443 B2
(45) Date of Patent: Jul. 14, 2015

(54) SHIELDLESS TOUCH SENSOR NOISE CANCELLATION

(71) Applicants: Samuel Brunet, Cowes (GB); Richard Paul Collins, Southampton (GB)

(72) Inventors: Samuel Brunet, Cowes (GB); Richard Paul Collins, Southampton (GB)

(73) Assignee: Atmel Corporation, San Jose, CA (US)

( * ) Notice: Subject to any disclaimer, the term of this patent is extended or adjusted under 35 U.S.C. 154(b) by 88 days.

(21) Appl. No.: 13/928,905

(22) Filed: Jun. 27, 2013

(65) Prior Publication Data
US 2015/0002443 A1     Jan. 1, 2015

(51) Int. Cl.
G06F 3/044    (2006.01)
G08C 21/00    (2006.01)
G06F 3/041    (2006.01)

(52) U.S. Cl.
CPC .............. *G06F 3/0418* (2013.01); *G06F 3/044* (2013.01)

(58) Field of Classification Search
CPC .......... G06F 3/044; G06F 2203/04111; G06F 2203/04113
USPC .......... 345/173, 174; 178/18.01, 18.03, 18.06
See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,723,824 B2 | 5/2014 | Myers | |
| 2008/0309635 A1 | 12/2008 | Matsuo | |
| 2009/0315854 A1 | 12/2009 | Matsuo | |
| 2011/0216033 A1* | 9/2011 | Mamba et al. | 345/174 |
| 2012/0075220 A1* | 3/2012 | Matsui et al. | 345/173 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Stephen Sherman
(74) *Attorney, Agent, or Firm* — Baker Botts LLP

(57) ABSTRACT

An apparatus may include a controller and a capacitive sensor that includes electrodes. The controller includes a processor and a memory. When logic is executed by the processor, the logic is capable of selecting a first subset of electrodes for measurement and selecting one of the electrodes from a second subset of electrodes as a reference drive electrode. The logic is further capable of determining a difference between a capacitance measurement of the first subset and a capacitance measurement of the reference drive electrode. The logic is also capable of adjust the capacitance measurement of the first electrode based at least in part upon the difference.

20 Claims, 6 Drawing Sheets

SHIELDLESS TOUCH SENSOR NOISE CANCELLATION

TECHNICAL FIELD

This disclosure relates generally to touch sensor technology.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), Smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
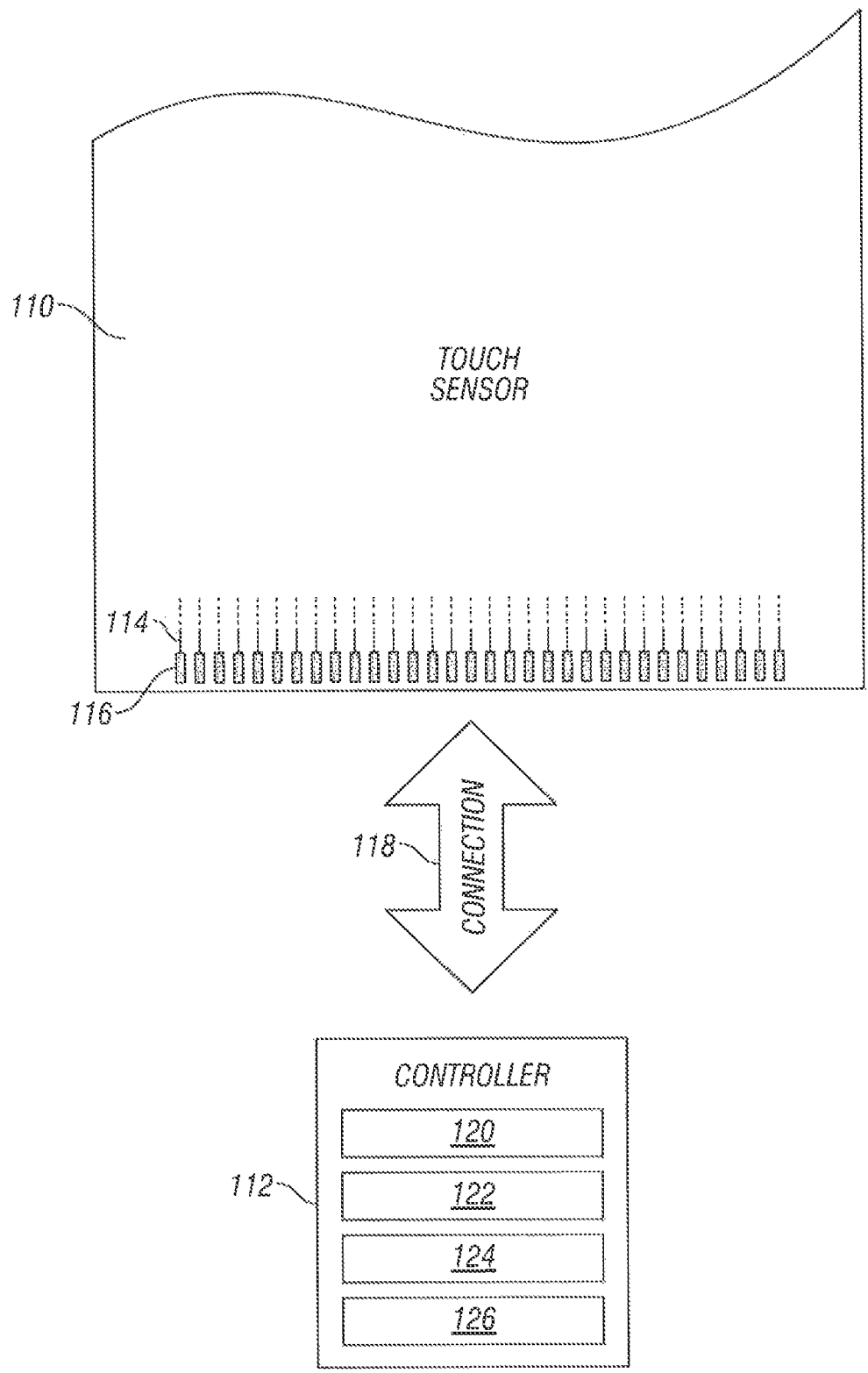
FIG. 1 illustrates an example touch sensor and controller.

In particular embodiments of a touch sensor, the touch sensor is arranged in rows and columns of electrode lines, with each row including a drive line and each column including a sense line. In that arrangement, capacitance may be measured by sequentially exciting each drive line with an electrical pulse and measuring the response on each sense line at an integrator. This method of measurement is generally referred to as a mutual capacitance measurement. The goal of the mutual capacitance measurement is to provide the change in capacitance between a drive line and a sense line, which may indicate the presence and extent of a touch. However, when the touch sensor is included in a device with a display and an electronic shield is not present between the touch sensor and display, the measurement of the change in capacitance may be inaccurate due to electronic noise.

Electronic noise causes several undesirable effects. First, electronic noise may reduce a signal's touch amplitude, which reduces the accuracy of the touch position estimate. Second, electronic noise may reduce the values of the touch amplitude so much that an "anti-touch" is created, which can cause large touch break-up, incorrect touch amplitude measurement, and reduced touch position accuracy. Finally, if the touch signal is small enough, the signal's touch amplitude may be overshadowed by the electronic noise. Thus, according to the teachings of the disclosure, it is desirable to compensate for electronic noise in a touch sensor. Traditional methods of reducing noise are accomplished by measuring capacitance simultaneously at all integrators coupled to sense lines of the touch sensor compensating for any electronic noise. However, the traditional method requires an integrator per sense line which increases a circuit's die size and cost and makes it difficult to implement in touch sensors for smaller displays.

Accordingly, aspects of the present disclosure include, in one embodiment, a touch sensor with a reduced number of integrators. By adding multiplexers between sense lines and integrators, the number of integrators can be reduced, thus reducing die size and costs associated with the touch sensor while also being suitable for use in devices with smaller displays, such as smart phones. However, reducing the number of integrators makes traditional methods of electronic noise compensation incompatible. Instead, a drive line may be selected for measurement of the change in capacitance. Additionally, one of the unselected drive lines can be selected by a multiplexer for measurement as a reference level of electronic noise present. For example, the reference drive line may be the furthest drive line from the first selected drive line. When the first drive line is excited with an electrical pulse, the response of a sense line may be measured. At or near the same time, the reference drive line may be excited and the response of a sense line may be measured. This measurement may represent the reference electronic noise level associated with the touch sensor. The initial measurement may then be adjusted accordingly to compensate for the amount of reference electronic noise present.

Figure 2:
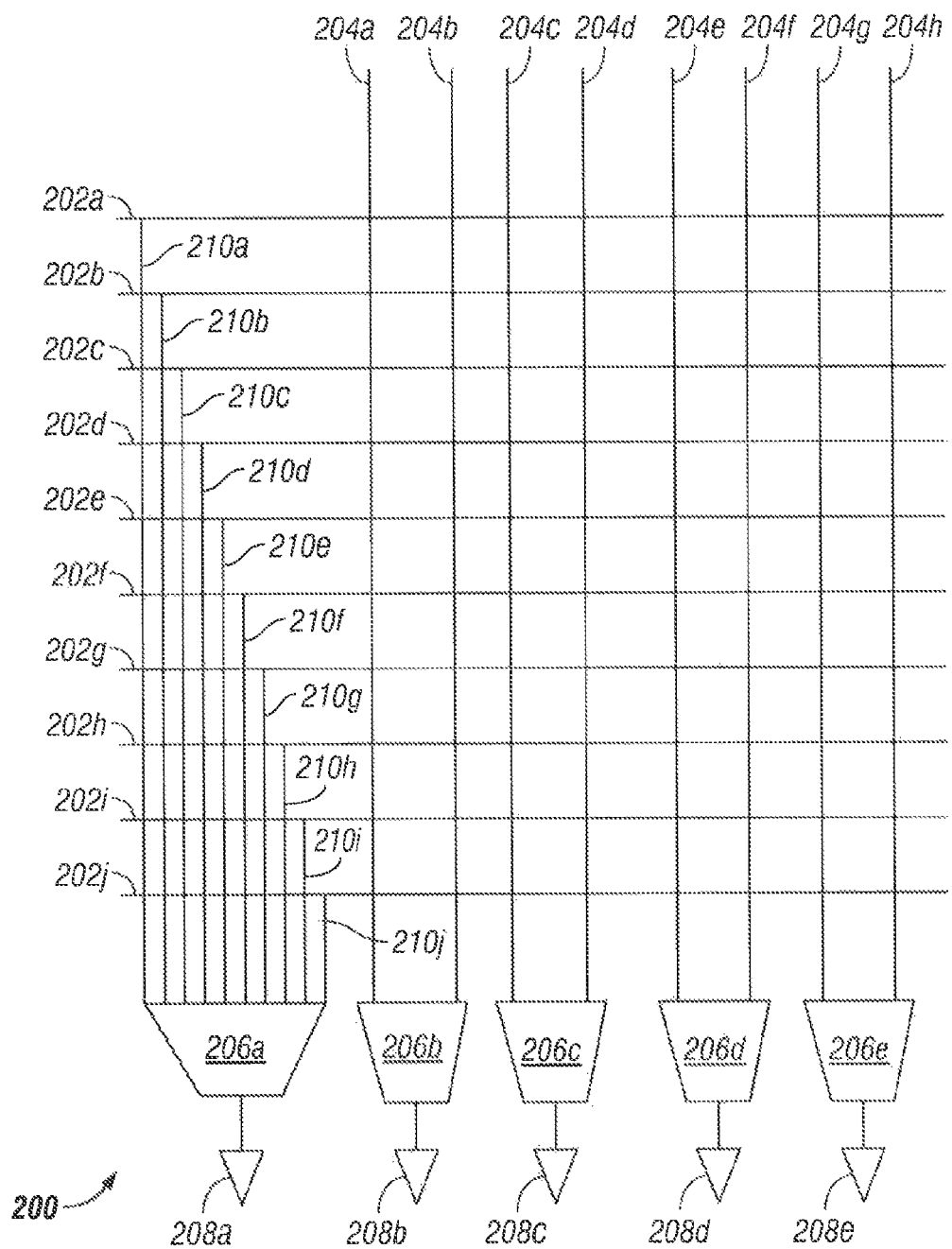
FIG. 2 illustrates a block diagram for example circuitry that may be used in the touch sensor of FIG. 1.
Figure 3:
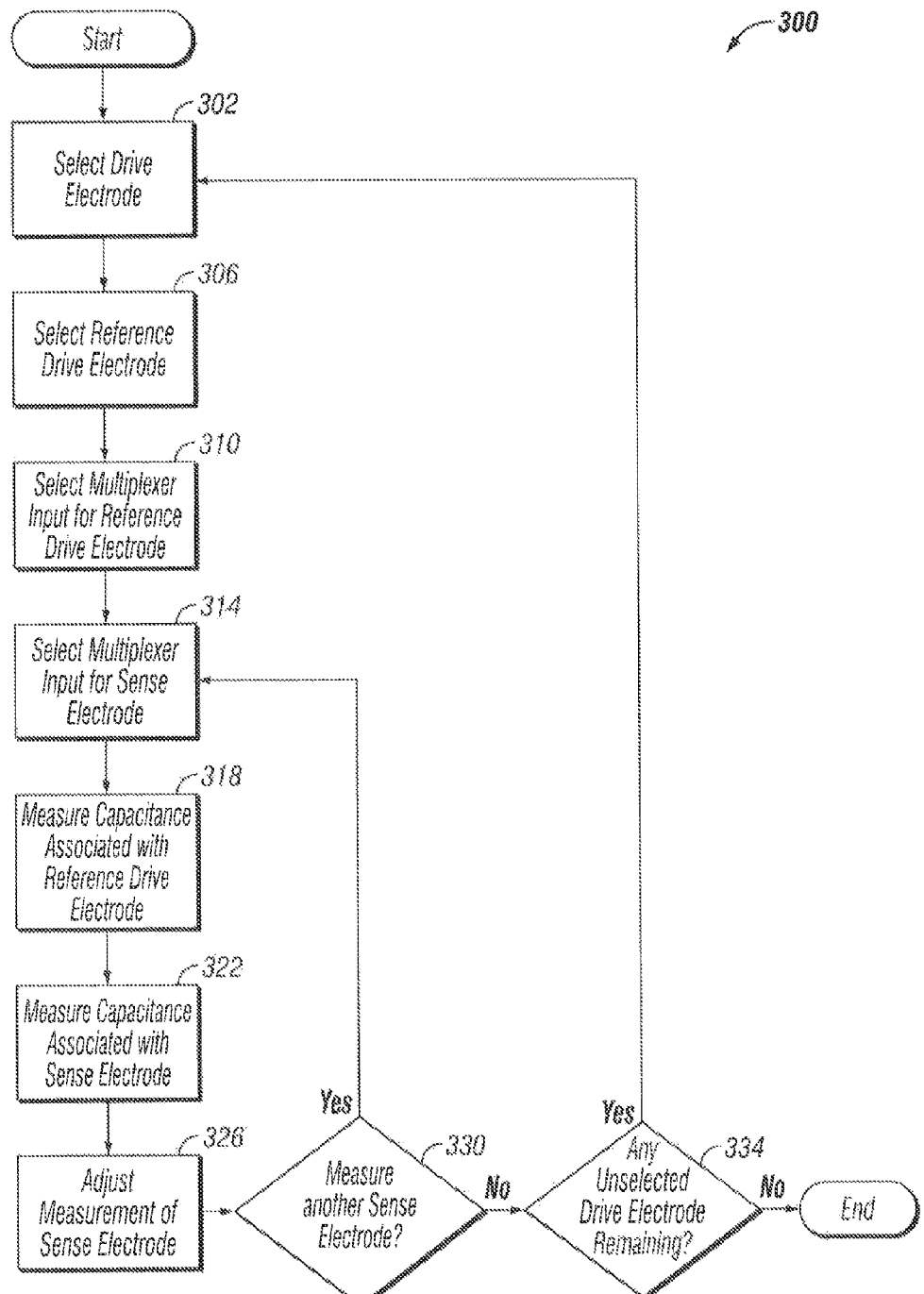
FIG. 3 is a flow chart illustrating an example method of shieldless noise cancellation, according to certain embodiments of the present disclosure.
Figure 4:
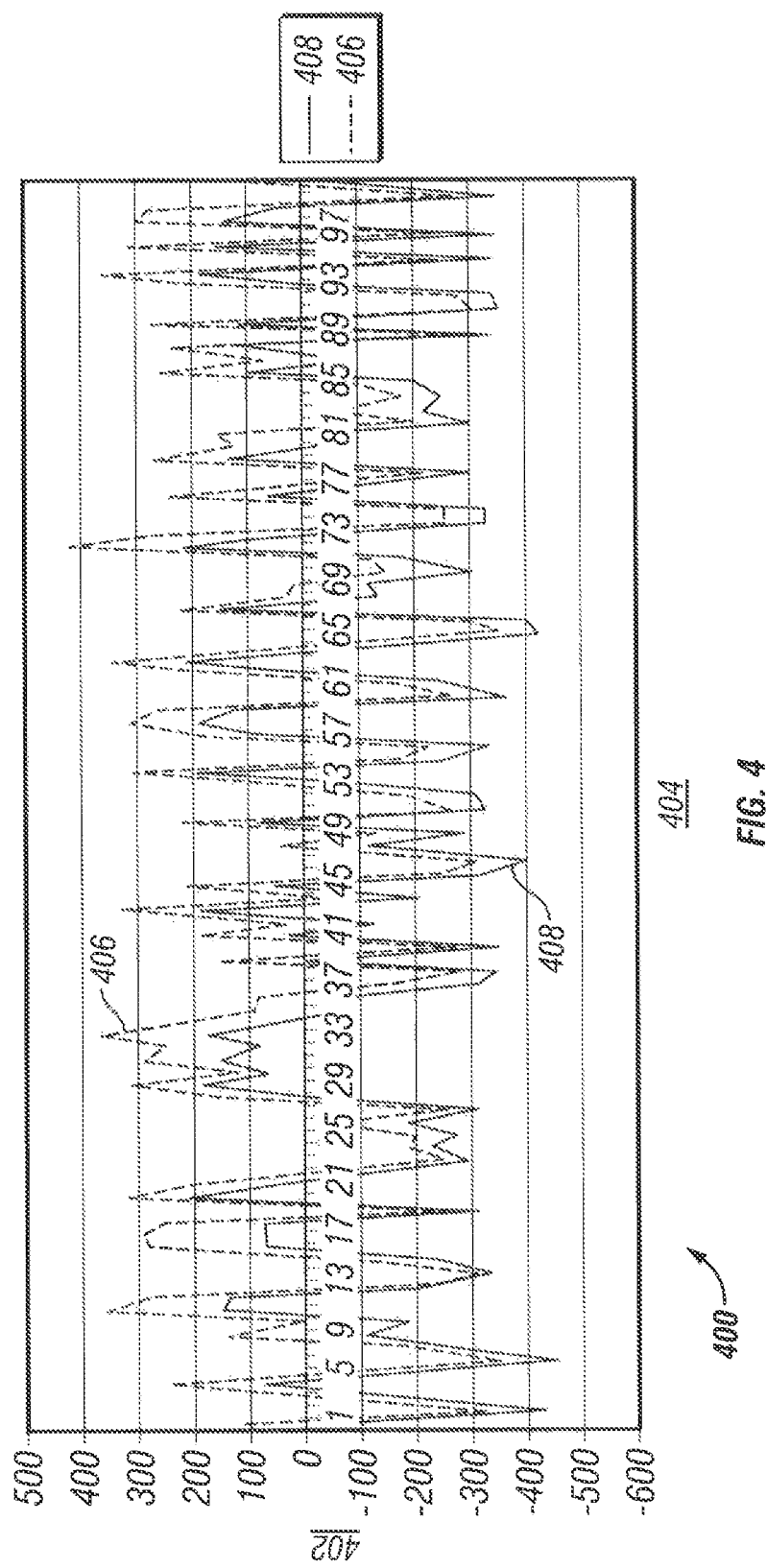
FIG. 4 illustrates an example of data representing measurements of capacitance, according to certain embodiments of the present disclosure.
Figure 5:
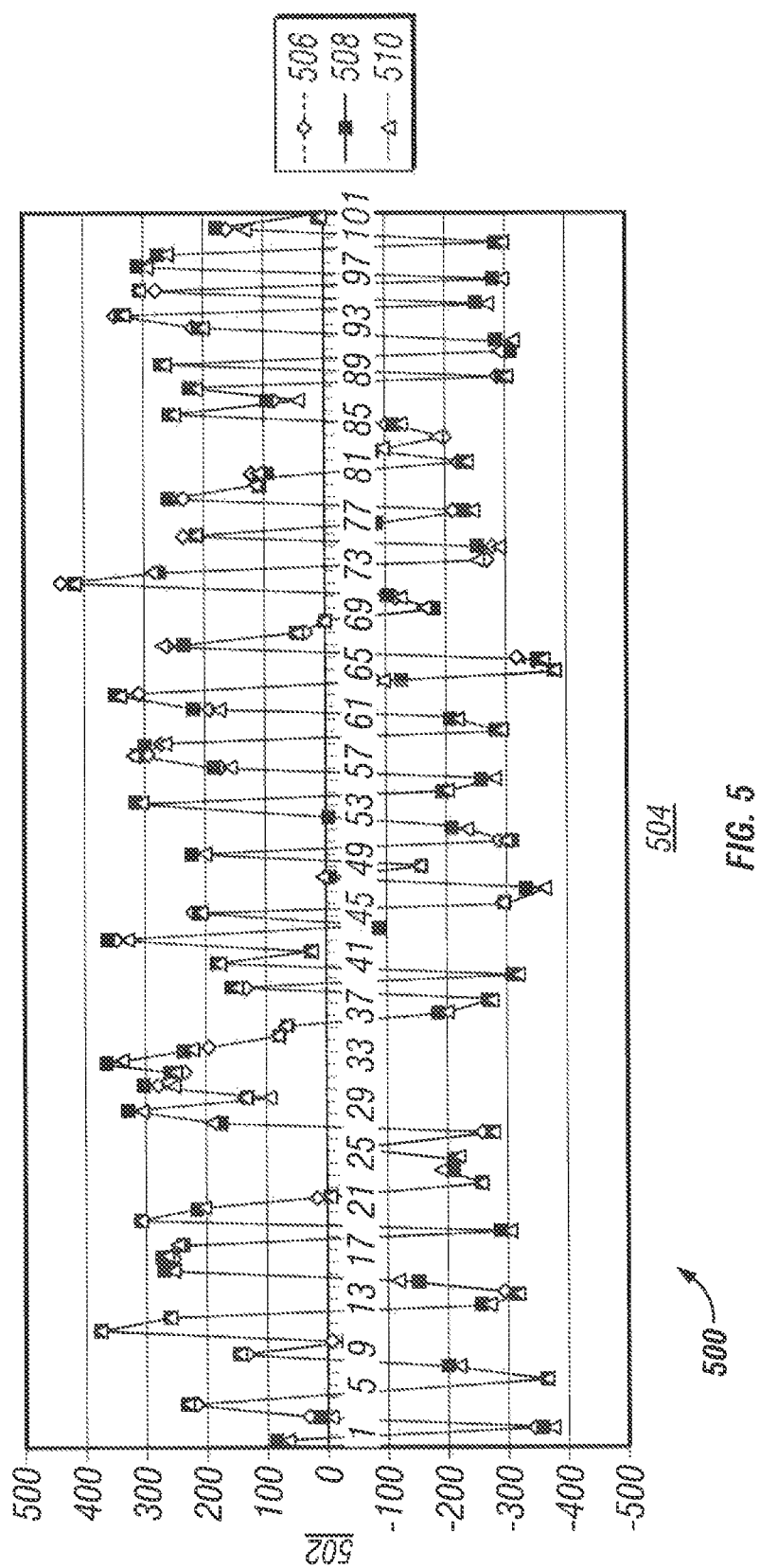
FIG. 5 illustrates an example of data representing measurements of capacitance before adjusting for noise, according to certain embodiments of the present disclosure.
Figure 6:
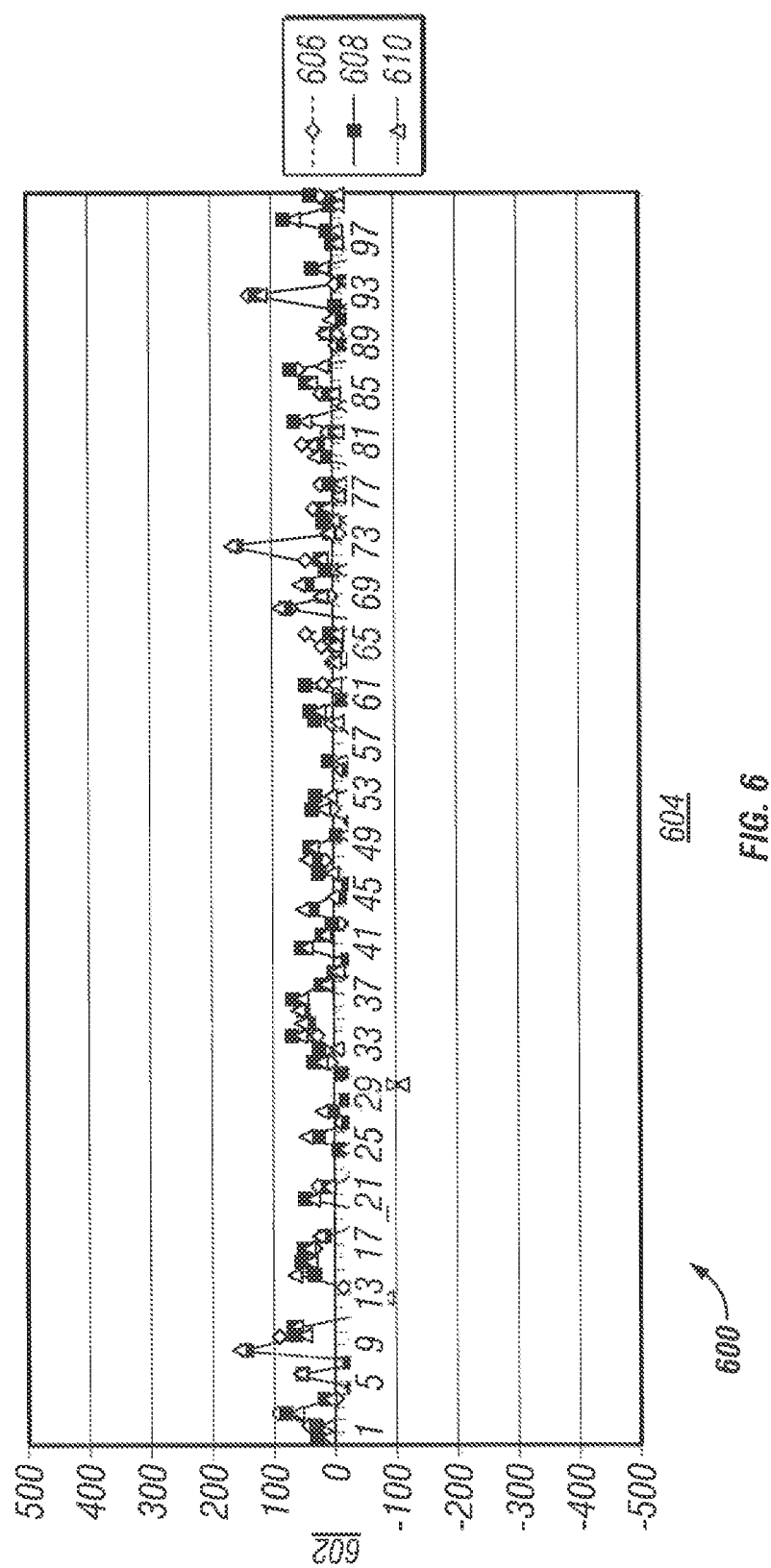
FIG. 6 illustrates an example of data representing measurements of capacitance after adjusting for noise, according to certain embodiments of the present disclosure.

Additional details are discussed in FIGS. 1 through 6. FIG. 1 illustrates an example touch sensor and controller. FIG. 2 illustrates a block diagram for example circuitry that may be used in the touch sensor of FIG. 1. FIG. 3 is a flow chart illustrating an example method of shieldless noise cancellation. FIG. 4 illustrates an example of data representing measurements of capacitance. FIG. 5 illustrates an example of data representing measurements of capacitance before adjusting for noise and FIG. 6 illustrates an example of data representing measurements of capacitance after adjusting for noise.

FIG. 1 illustrates an example touch sensor 110 with an example touch-sensor controller 112, according to certain embodiments of the present disclosure. Touch sensor 110 and touch-sensor controller 112 may detect the presence and location of a touch or the proximity of an object within a touch-sensitive area of touch sensor 110. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 110 may include one or more touch-sensitive areas, where appropriate. Touch sensor 110 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 110. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 110 and touch-sensor controller 112. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 110 may be made of polyethylene terephthalate (PET) or another suitable material. This disclosure contemplates any suitable substrate with any suitable portions made of any suitable material. In particular embodiments, the drive or sense electrodes in touch sensor 110 may be made of ITO in whole or in part. In particular embodiments, the drive or sense electrodes in touch sensor 110 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 110 may implement a capacitive form of touch sensing. In a mutual-capacitance implementation, touch sensor 110 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 112) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 112 may measure the change in capacitance. By measuring changes in capacitance throughout the array, touch-sensor controller 112 may determine the position of the touch or proximity within the touch-sensitive area(s) of touch sensor 110.

In a self-capacitance implementation, touch sensor 110 may include an array of electrodes of a single type that may each form a capacitive node. When an object touches or comes within proximity of the capacitive node, a change in self-capacitance may occur at the capacitive node and touch-sensor controller 112 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 112 may determine the position of the touch or proximity within the touch-sensitive area(s) of touch sensor 110. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 110 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 110 may have drive electrodes disposed in a pattern on one side of a substrate and sense electrodes disposed in a pattern on another side of the substrate. Moreover, touch sensor 110 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 110 may indicate a touch or proximity input at the position of the capacitive node. Touch-sensor controller 112 may detect and process the change in capacitance to determine the presence and location of the touch or proximity input. Touch-sensor controller 112 may then communicate information about the touch or proximity input to one or more other components (such one or more central processing units (CPUs)) of a device that includes touch sensor 110 and touch-sensor controller 112, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 112 may be one or more integrated circuits (ICs), such as for example general-purpose microprocessors, microcontrollers, programmable logic devices or arrays, application-specific ICs (ASICs). In particular embodiments, touch-sensor controller 112 comprises analog circuitry, digital logic, and digital non-volatile memory. In particular embodiments, touch-sensor controller 112 is disposed on a flexible printed circuit (FPC) bonded to the substrate of touch sensor 110, as described below. The FPC may be active or passive, where appropriate. In particular embodiments, multiple touch-sensor controllers 112 are disposed on the FPC. Touch-sensor controller 112 may include a processor unit 120, a drive unit 122, a sense unit 124, and a storage unit 126. Drive unit 122 may supply drive signals to the drive electrodes of touch sensor 110. Sense unit 124 may sense charge at the capacitive nodes of touch sensor 110 and provide measurement signals to processor unit 120 representing capacitances at the capacitive nodes. Processor unit 120 may control the supply of drive signals to the drive electrodes by drive unit 122 and process measurement signals from sense unit 124 to detect and process the presence and location of a touch or proximity input within the touch-sensitive area(s) of touch sensor 110. Processing measurement signals may include filtering, calculating gradients, and restructuring the measurement signals to more accurately represent the touch or proximity input. The processor unit may also track changes in the position of a touch or proximity input within the touch-sensitive area(s) of touch sensor 110. Storage unit 126 may store programming for execution by processor unit 120, including programming for controlling drive unit 122 to supply drive signals to the drive electrodes, programming for processing measurement signals from sense unit 124, and other suitable programming, where appropriate. Although this disclosure describes a particular touch-sensor controller having a particular implementation with particular components, this disclosure contemplates any suitable touch-sensor controller having any suitable implementation with any suitable components.

Tracks 114 of conductive material disposed on the substrate of touch sensor 110 may couple the drive or sense electrodes of touch sensor 110 to connection pads 116, also disposed on the substrate of touch sensor 110. As described below, connection pads 116 facilitate coupling of tracks 114 to touch-sensor controller 112. Tracks 114 may extend into or around (e.g. at the edges of) the touch-sensitive area(s) of touch sensor 110. Particular tracks 114 may provide drive connections for coupling touch-sensor controller 112 to drive electrodes of touch sensor 110, through which drive unit 122 of touch-sensor controller 112 may supply drive signals to the drive electrodes. Other tracks 114 may provide sense connections for coupling touch-sensor controller 112 to sense electrodes of touch sensor 110, through which sense unit 124 of touch-sensor controller 112 may sense charge at the capacitive nodes of touch sensor 110. Tracks 114 may be made of fine lines of metal or other conductive material. As an example and not by way of limitation, the conductive material of tracks 114 may be copper or copper-based and have a width of approximately 100 μm or less. As another example, the conductive material of tracks 114 may be silver or silver-based and have a width of approximately 100 μm or less. In particular embodiments, tracks 114 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 114, touch sensor 110 may include one or more ground lines terminating at a ground connector (which may be a connection pad 116) at an edge of the substrate of touch sensor 110 (similar to tracks 114).

Connection pads 116 may be located along one or more edges of the substrate, outside the touch-sensitive area(s) of touch sensor 110. As described above, touch-sensor controller 112 may be on an FPC. Connection pads 116 may be made of the same material as tracks 114 and may be bonded to the FPC using an anisotropic conductive film (ACF). Connection 118 may include conductive lines on the FPC coupling touch-sensor controller 112 to connection pads 116, in turn coupling touch-sensor controller 112 to tracks 114 and to the drive or sense electrodes of touch sensor 110. In another embodiment, connection pads 116 may be connected to an electro-mechanical connector (such as a zero insertion force wire-to-board connector); in this embodiment, connection 118 may not need to include an FPC. This disclosure contemplates any suitable connection 118 between touch-sensor controller 112 and touch sensor 110.

Certain embodiments of touch sensor 110 and touch-sensor controller 112 may measure capacitance or a change in capacitance using any suitable method. For example, voltage may be applied to one or more tracks 114 by opening or closing one or more switches associated with one or more tracks 114. Such switches may connect one or more tracks 14 to other portions of touch sensor 110 or touch-sensor controller 112 such as, for example, a voltage supply rail, ground, virtual ground, and/or any other suitable component. Such methods may cause charge to be transferred to or from one or more portions of tracks 114 (e.g., one or more drive lines), which may induce a corresponding transfer of charge on one or more portions of one or more other tracks 114 (e.g., one or more sense lines). The presence of an object such as a finger or a stylus may affect the amount of charge induced on the sensed track 114, and this effect may be measured by touch-controller 112 to determine the position of the object. Certain embodiments may perform measurements using any suitable number of steps that facilitate capacitance measurements. For example, some embodiments may perform any suitable combination of pre-charging one or more tracks 114, charging one or more tracks 114, transferring charge between two or more tracks 114, discharging one or more tracks 114, and/or any other suitable step. In some embodiments, a transfer of charge may be measured directly or indirectly. For example, certain embodiments may utilize voltage measurements, current measurements, timing measurements, any other suitable measurement, or any combination thereof to measure capacitance or a change in capacitance at one or more capacitive nodes 116. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of an object's position relative to touch sensor 110.

FIG. 2 illustrates a block diagram for example circuitry that may be used in the touch sensor of FIG. 1. Generally, the die size and cost of a touch sensor may be reduced by reducing the number of integrators used by the touch sensor. To compensate for the reduced number of integrators, multiplexers may be added to the touch sensor. More specifically, block diagram 200 includes drive lines 202, sense lines 204, multiplexers 206, integrators 208, and reference sense lines 210.

Block diagram 200 includes drive lines 202. Drive lines 202 may provide drive connections for coupling touch-sensor controller 112 to drive electrodes of touch sensor 110, through which drive unit 122 of touch-sensor controller 112 may supply drive signals to the drive electrodes. In certain embodiments, drive lines 202 may be tracks 114 depicted in FIG. 1. Drive lines 202a through 202j of FIG. 2 represent example drive lines 202 that may be used in touch sensor 110. Although a certain number of drive lines 202 are depicted in FIG. 2, touch sensor 110 is capable of supporting any number of drive lines 202 as suitable for a particular purpose.

Block diagram 200 also includes sense lines 204. Sense lines 204 may provide sense connections for coupling touch-sensor controller 112 to sense electrodes of touch sensor 110, through which sense unit 124 of touch-sensor controller 112 may sense charge at the capacitive nodes of touch sensor 110. In certain embodiments, sense lines 204 may be tracks 114 depicted in FIG. 1. Sense lines 204a through 204h represent example sense lines 204 that may be used in touch sensor 110. Although a certain number of sense lines 204 are depicted in FIG. 2, touch sensor 110 is capable of supporting any number of sense lines 204 as suitable for a particular purpose. Touch sensor 110 may also include reference sense lines 210. Reference sense lines 210 operate similarly to sense lines 204. Reference sense lines 210 may be used by touch-sensor controller 112 to calculate a reference level of electronic noise present in touch sensor 110. Reference sense lines 210a through 210j of FIG. 2 represent example reference sense lines 210. Although a certain number of reference sense lines 210 are depicted, touch sensor 110 is capable of supporting any number of reference sense lines 210 as suitable for a particular purpose. In certain embodiments, the number of reference sense lines 210 may be equal to the number of drive lines 202 present in touch sensor 110. In other embodiments, the number of reference sense lines 210 may be less than the number of drive lines 202 present in touch sensor 110.

Sense lines 204 and reference sense lines 210 may be coupled to multiplexers 206. Multiplexer 206 may be any device capable of selecting one of N input signals, where N is an integer representing any number of input signals suitable for a particular purpose. For example, multiplexer 206a may be any multiplexer 206 capable of selecting one of the input signals received from reference sense lines 210a through 210j and multiplexers 206b through 206e may be any multiplexer 206 capable of selecting an input signal from one of two sense lines 204. Multiplexers 206 may each be coupled to an integrator 208. Integrator 208 is any device capable of measuring an input signal selected by multiplexer 206. In certain embodiments, integrator 208 may be an analog device. Although a certain number of multiplexers 206 and integrators 208 are depicted in FIG. 2, touch sensor 110 is capable of supporting any number of multiplexers 206 and/or integrators 208 as suitable for a particular purpose. According to some embodiments, the number of multiplexers 206 and integrators 208 included in block diagram 200 may be equal to N/2+1 where N is the number of drive lines 202 included in block diagram 200.

The operation of touch sensor 110 implementing block diagram 200 will now be discussed. In certain embodiments, the operation of touch sensor 110 may be implemented using processing unit 120 executing logic stored in storage unit 126. Drive lines 202 and sense lines 204 may generally operate as described above with regard to tracks 114 in FIG. 1. A particular drive electrode corresponding to a particular drive line 202 may be selected for measurement. As an example, drive line 202a may be selected for measurement. To measure a reference electronic noise level, a particular drive electrode corresponding to a particular drive line 202 may be selected as a reference drive electrode. In certain embodiments, the drive electrode selected as the reference drive electrode may be based on distance to avoid the possibility of picking up any noise from the drive line 202 that was selected for measurement. As an example, the drive electrode corresponding to the drive line 202 furthest from the drive line 202 selected for measurement may be selected as the reference drive electrode. In the current example, drive electrode corresponding to drive line 202*j* may be selected as the reference drive electrode. As another example, if drive line 202*g* is selected for measurement, the drive electrode corresponding to drive line 202*a* may be selected as the reference drive electrode.

Once the reference drive electrode is selected for measurement, multiplexer 206 may select the signal input from the reference sense line 210 associated with the reference drive electrode. In the current example, multiplexer 206*a* may select the signal input from reference sense line 210*j* which is associated with drive line 202*j*. Similarly, a sense electrode corresponding to a particular sense line 204 may be selected for measurement by using a multiplexer 206 to select the input from the particular sense line 204. For example, if the sense electrode corresponding to sense line 204*a* is selected for measurement, then multiplexer 206*b* may select the signal input corresponding to sense line 204*a*.

After multiplexers 206 have selected appropriate input signals corresponding to appropriate sense lines 204 or reference sense lines 210, integrators 208 may measure capacitance associated with a particular sense line 204 or reference sense line 210. In the current example, integrator 208*a* may measure the signal selected by multiplexer 206*a* while integrator 208*b* may measure the signal selected by multiplexer 206*b*. The measurement of the signal corresponding to the selected drive electrode by integrator 208 may be considered the reference electronic noise level.

Once the reference electronic noise level is determined, the measurement of the signal corresponding to the appropriate sense line 204 may be adjusted. In certain embodiments, the reference electronic noise level may be scaled to compensate for any difference in pickup between drive lines 202 and/or sense lines 204 in touch sensor 110. The measurement of the signal corresponding to the appropriate sense line 204 may then be adjusted by subtracting the scaled reference noise level from the measurement.

This process may be repeated until a sufficient number of sense lines 204 along a particular drive line 202 have been measured. In certain embodiments, a sufficient number may be all sense lines 204 along a particular drive line 202. Once a sufficient number of sense lines 204 have been measured, the result is a full array of data for sense lines 204 along a particular drive line 202. In certain embodiments, after a sufficient number of measurements have been collected along a particular drive line 202, the multiplexed measurements that have been made and noise corrected may be de-multiplexed into a complete full array of data for sense lines 204 along a particular drive line 202. After completing a full array of data for sense lines 204 along a particular drive line 202, the process may be repeated until a sufficient number of arrays for drive lines 202 have been completed. In certain embodiments, a sufficient number may be arrays for all drive lines 202.

FIG. 3 is a flow chart illustrating an example method of shieldless noise cancellation, according to certain embodiments of the present disclosure. In certain embodiments, example method 300 may be implemented by processing unit 120 executing logic stored in storage unit 126. Example method 300 may start at step 302. At step 302, a particular drive electrode corresponding to a particular drive line 202 may be selected for measurement. As an example, drive line 202*a* may be selected for measurement. Next, at step 306, to measure a reference electronic noise level, a particular drive electrode corresponding to a particular drive line 202 may be selected as a reference drive electrode. In certain embodiments, the drive electrode selected as the reference drive electrode may be based on distance to avoid the possibility of picking up any noise from the drive line 202 that was selected for measurement. As an example, the drive electrode corresponding to the drive line 202 furthest from the drive line 202 selected for measurement may be selected as the reference drive electrode. In the current example, drive electrode corresponding to drive line 202*j* may be selected as the reference drive electrode.

Once the reference drive electrode is selected for measurement, at step 310, multiplexer 206 may select the signal input from the reference sense line 210 associated with the reference drive electrode. In the current example, multiplexer 206*a* may select the signal input from reference sense line 210*j* which is associated with drive line 202*j*. Similarly, at step 314, a sense electrode corresponding to a particular sense line 204 may be selected for measurement by using a multiplexer 206 to select the input from the particular sense line 204. For example, if the sense electrode corresponding to sense line 204*a* is selected for measurement, then multiplexer 206*b* may select the signal input corresponding to sense line 204*a*. Example method 300 may then proceed to step 318.

At step 318, after multiplexers 206 have selected appropriate input signals corresponding to appropriate sense lines 204 or reference sense lines 210, integrators 208 may measure capacitance associated with reference sense line 210. In the current example, integrator 208*a* may measure the signal selected by multiplexer 206*a*. The measurement by integrator 208 of the signal corresponding to the drive electrode selected at step 306 may be considered the reference electronic noise level. Next, at step 322, integrators 208 may measure capacitance associated with a particular sense line 204 selected for measurement. In the current example, integrator 208*b* may measure the signal selected by multiplexer 206*b*. Example method 300 may then proceed to step 326.

At step 326, once the reference electronic noise level is determined, the measurement of the signal corresponding to the appropriate sense line 204 may be adjusted. In certain embodiments, the reference electronic noise level may be scaled to compensate for any difference in pickup between drive lines 202 and/or sense lines 204 in touch sensor 110. The measurement of the signal corresponding to the appropriate sense line 204 may then be adjusted by subtracting the scaled reference noise level from the measurement.

Next, at step 330, touch-sensor controller 112 may determine whether another sense line 204 corresponding to another sense electrode may be measured. In certain embodiments, a sufficient number may be all sense lines 204 along a particular drive line 202. If it is determined that another sense line 204 corresponding to another sense electrode will be measured, example method 300 may return to step 314. Otherwise, example method 300 may proceed to step 334. At step 334, a sufficient number of measurements have been collected along a particular drive line 202 and the multiplexed measurements that have been made and noise corrected may be de-multiplexed into a complete full array of data for sense lines 204 along a particular drive line 202. After completing a full array of data for sense lines 204 along a particular drive line 202, touch-sensor controller 112 may determine if there remains any unselected drive electrodes to be measured. If there are other drive lines 202 corresponding to drive electrodes to be measured, then example method 300 may return to step 302. Otherwise, example method 300 may end.

Method 300 illustrates an example method of operating touch-sensor controller 112 to compensate for electronic noise levels. Modifications, additions, or omissions may be made without departing from the scope of this disclosure. Steps may be combined, modified, or deleted where appropriate, and additional steps may be added.

FIG. 4 illustrates an example of data representing measurements of capacitance, according to certain embodiments of the present disclosure. Example graph 400 is a graph of example data representing measurements of capacitance change 402 over time 404. Line 406 may represent measurements of a particular sense line 204 along a particular drive line 202 that have been selected for measurement. For example, line 406 may represent measurements of sense line 204e along drive line 202b. Line 408 may represent measurements of a drive electrode corresponding to a drive line 202 that has been selected as the reference drive electrode. Thus, line 408 may be considered the reference electronic noise level. In this example, line 408 may represent measurements for drive line 202j. The measurement data along line 406 at a particular point in time 404 may be adjusted by subtracting the measurement data along line 408 at the particular point in time 404.

FIG. 5 illustrates an example of data representing measurements of capacitance before adjusting for noise, according to certain embodiments of the present disclosure. Example graph 500 is a graph of example data representing measurements of capacitance change 502 over time 504. Lines 506, 508, and 510 represent example measurements of different sense lines 204 along a particular drive line 202. As an example, line 506 may represent a measurement of sense line 204a and drive line 202a, line 508 may represent a measurement of sense line 204b and drive line 202a, and line 510 may represent a measurement of sense line 204c and drive line 202a.

FIG. 6 illustrates an example of data representing measurements of capacitance after adjusting for noise, according to certain embodiments of the present disclosure. Example graph 600 is a graph of what example data representing measurements of capacitance change 602 over time 604 may look once adjusted for electronic noise level. Line 606 represents measurements corresponding to line 506 of FIG. 5 after the measurements have been adjusted for electronic noise level. Similarly, lines 608 and 610 correspond to lines 508 and 510, respectively, of FIG. 5 after the measurements have been adjusted for electronic noise level.

Certain embodiments of the invention may provide one or more technical advantages. In some embodiments, compensating for electronic noise levels corrects erroneous touch amplitude data. Additionally, compensating for electronic noise levels increases the accuracy of touch position estimation and reduces the likelihood that touches will completely disappear. Moreover, reducing the number of integrators will greatly reduce die size and costs which allows for cheaper and smaller touch screen devices.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, in particular embodiments. A computer-readable non-transitory storage medium or media may be volatile, non-volatile, or a combination of volatile and non-volatile, in particular embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
    a mutual-capacitance touch sensor comprising:
        a first plurality of electrodes comprising a first drive electrode and a first sense electrode;
        a second plurality of electrodes comprising a plurality of drive electrodes;
        a plurality of reference sense lines corresponding to a respective one or more of the second plurality of electrodes;
        a multiplexer operable to select input from one of the second plurality of electrodes; and
        an integrator coupled to the multiplexer, the integrator operable to measure the capacitance of the selected input from one of the second plurality of electrodes; and
    a controller comprising:
        a processor; and
        a memory communicatively coupled to the processor, the memory comprising logic, when executed by the processor, operable to:
            select a reference drive electrode from one of the second plurality of electrodes;
            determine a capacitive measurement of the reference drive electrode using a selected reference sense line of the plurality of reference sense lines that corresponds to the reference drive electrode;
            determine a reference noise level by calculating a difference between a capacitance measurement of the first plurality of electrodes and the capacitance measurement of the reference drive electrode; and
            adjust the capacitance measurement of the first plurality of electrodes based at least in part upon the reference noise level.

2. The apparatus of claim 1, further comprising:
    a second multiplexer operable to select input from one of the first plurality of electrodes; and
    a second integrator coupled to the second multiplexer, the second integrator operable to measure the capacitance of the selected input from one of the first plurality of electrodes.

3. The apparatus of claim 1, wherein the capacitance measurement of the first plurality of electrodes is based upon a capacitance change at a capacitance node associated with the first drive electrode.

4. The apparatus of claim 1, wherein the capacitance measurement of the reference drive electrode is based upon a capacitance change at a capacitance node associated with the reference drive electrode.

5. The apparatus of claim 1, wherein selecting the reference drive electrode is based at least in part upon the distance between the reference drive electrode and the first drive electrode.

6. The apparatus of claim 1, wherein the logic, when executed by the processor, is further operable to:
   select a second reference drive electrode from the first plurality of electrodes;
   determine a second reference noise level by calculating the difference between a capacitance measurement of the second plurality of electrodes and a capacitance measurement of the second reference drive electrode; and
   adjust the capacitance measurement of the second plurality of electrodes based at least in part upon the second noise level.

7. An apparatus comprising:
   a capacitive sensor comprising:
      a plurality of electrodes comprising a plurality of drive electrodes and a plurality of sense electrodes;
      a controller comprising:
      a processor; and
      a memory communicatively coupled to the processor, the memory comprising logic, when executed by the processor, operable to:
         select a first subset of the plurality of electrodes for measurement;
         select a reference drive electrode from a second subset of the plurality of electrodes, wherein the first subset is distinct from the second subset;
         determine a capacitive measurement of the reference drive electrode using a selected reference sense line of a plurality of reference sense lines that is corresponds to the reference drive electrode, the plurality of reference sense lines corresponding to a respective one or more of the second subset of the plurality of electrodes;
         determine a difference between a capacitance measurement of the first subset and the capacitance measurement of the reference drive electrode; and
         adjust the capacitance measurement of the first subset based at least in part upon the difference between the capacitance measurement of the first subset and the capacitance measurement of the reference drive electrode.

8. The apparatus of claim 7, wherein the capacitive sensor is a mutual-capacitance touch sensor, the apparatus further comprising:
   a multiplexer operable to select input from one of the plurality of electrodes; and
   an integrator coupled to the multiplexer, the integrator operable to measure capacitance of the selected input.

9. The apparatus of claim 7, wherein the first subset comprises a first drive electrode and a first sense electrode.

10. The apparatus of claim 9, wherein the capacitance measurement of the first subset is based at least in part upon detecting a first capacitance change at a capacitance node associated with the first drive electrode.

11. The apparatus of claim 9, wherein the second subset comprises two or more drive electrodes and wherein the capacitance measurement of the second subset is based at least in part upon detecting a second capacitance change at a capacitance node associated with the reference drive electrode.

12. The apparatus of claim 9, wherein selecting the reference drive electrode is based at least in part upon the distance between the reference drive electrode and the first drive electrode.

13. The apparatus of claim 9, wherein the logic, when executed by the processor, is further operable to:
   select a second reference drive electrode from the first subset;
   determine a second reference noise level by calculating the difference between a capacitance measurement of the second subset and a capacitance measurement of the second reference drive electrode; and
   adjust the capacitance measurement of the second subset based at least in part upon the second difference.

14. A method for noise cancellation, comprising:
   selecting a first subset of a plurality of electrodes of a capacitive sensor for measurement, the plurality of electrodes comprising a plurality of drive electrodes and a plurality of sense electrodes;
   selecting a reference drive electrode from a second subset of the plurality of electrodes, wherein the first subset is distinct from the second subset;
   determining a capacitive measurement of the reference drive electrode using a selected reference sense line of a plurality of reference sense lines that corresponds to the reference drive electrode, the plurality of reference sense lines corresponding to a respective one or more of the second subset of the plurality of electrodes;
   determining a difference between a capacitance measurement of the first subset and a capacitance measurement of the reference drive electrode; and
   adjusting the capacitance measurement of the first subset based at least in part upon the difference between the capacitance measurement of the first subset and the capacitance measurement of the reference drive electrode.

15. The method of claim 14, further comprising:
   selecting, using a multiplexer, input from one of the plurality of electrodes; and
   determining, using an integrator coupled to the multiplexer, a measurement of the selected input.

16. The method of claim 14, wherein the capacitive sensor is a mutual-capacitance touch sensor and the first subset comprises a first drive electrode and a first sense electrode.

17. The method of claim 16, wherein the capacitance measurement of the first subset is based at least in part upon detecting a first capacitance change at a capacitance node associated with the first drive electrode.

18. The method of claim 16, wherein the second subset comprises two or more drive electrodes and wherein the capacitance measurement of the second subset is based at least in part upon detecting a second capacitance change at a capacitance node associated with the reference drive electrode.

19. The method of claim 18, wherein selecting the reference drive electrode is based at least in part upon the distance between the reference drive electrode and the first drive electrode.

20. The method of claim 16, further comprising:
   selecting a second reference drive electrode from the first subset;
   determining a second reference noise level by calculating the difference between a capacitance measurement of the second subset and a capacitance measurement of the second reference drive electrode; and adjusting the capacitance measurement of the second subset based at least in part upon the second difference.

* * * * *